United States Patent

Sawaf

[11] Patent Number: 5,517,785
[45] Date of Patent: May 21, 1996

[54] SWEEPLINE CONSTRUCTION FOR A BOTTOM TRAWL

[76] Inventor: Sherif Sawaf, 232 University Ave., Davis, Calif. 95616

[21] Appl. No.: 291,874

[22] Filed: Aug. 17, 1994

[51] Int. Cl.$^6$ .................................................. A01K 73/02
[52] U.S. Cl. .................................. 43/9.9; 43/9.1; 43/9.2
[58] Field of Search .............................. 43/9.1, 9.4, 9.8, 43/9.9, 9.5, 9.2

[56] References Cited

U.S. PATENT DOCUMENTS

| | | | |
|---|---|---|---|
| 2,744,350 | 5/1956 | Bass | 43/9.9 |
| 2,890,542 | 6/1959 | Willingham | 43/9.1 |
| 3,143,821 | 8/1964 | Luketa | 43/9.8 |
| 4,813,170 | 3/1989 | Bendiksen | 43/9.5 |
| 5,068,994 | 12/1991 | Stone | 43/9.9 |

FOREIGN PATENT DOCUMENTS

| | | | |
|---|---|---|---|
| 0640154 | 7/1928 | France | 43/9.1 |
| 0021440 | 8/1930 | Netherlands | 43/9.1 |
| 0025838 | 7/1931 | Netherlands | 43/9.1 |

*Primary Examiner*—P. Austin Bradley
*Assistant Examiner*—James Miner
*Attorney, Agent, or Firm*—Harold D. Messner

[57] ABSTRACT

In one aspect, the sweepline system of the invention include a sweepline chain divided into a series of uniform subunits of common length attached along its U-shaped length to the hanging chains of the bottom trawl wherein such sweepline system is provided with its own separate auxiliary floatation system. In another aspect, a series of transverse drag chains are attached relative to the sweepline chain or the like, at a series of equally spaced junctions and downwardly sweep from such junctions in a downwardly depending direction, such junctions being located below the trawl net but above the bottom of the ocean, sea or the like wherein each drag chain comprises a series of chain links of overall length L defining a series of hinges therealong at the intersection of the individual links. In yet another aspect, the auxiliary floatation system of the invention is constructed so as to maintain attaching ends of the transverse drag chains (coincident with the series of junctions) at a rest elevation E above the ocean or sea bottom wherein L>E whereby a free end portion of each drag chain rests on the ocean bottom but at any conventional towing speed, such free end portion changes orientation relative to the ocean bottom due to the resistance of the water to be angled away from the direction of net towing but wherein such free end portion still has an included segment that remains in contact with the ocean bottom to form both a physical and a visible deterrent to fish to thereby prevent their escape under the trawl net.

24 Claims, 3 Drawing Sheets

5,517,785

SWEEPLINE CONSTRUCTION FOR A BOTTOM TRAWL

The present invention relates to a bottom trawl attached to a towing vessel located at the surface of an ocean, sea, bay or the like for the purpose of bottom trawl fishing and more particularly, to a sweepline system for connection to a series of hanging chains depending from such bottom trawl wherein the latter includes a trawl net having side wings, a mouth and a floatation system attached to a leading edge of the net.

In one aspect, the sweepline system of the invention includes a sweepline chain divided into a series of uniform subunits of common length attached along its U-shaped length to the hanging chains of the bottom trawl wherein such sweepline system is provided with its own separate auxiliary floatation system.

In another aspect, a series of drag chains are attached relative to the sweepline chain or the like, at a series of equally spaced junctions and downwardly sweep from such junctions in a downwardly depending direction, such junctions being located below the trawl net but above the bottom of the ocean, sea or the like wherein each drag chain comprises a series of chain links of overall length L defining a series of hinges therealong at the intersection of the individual links.

In yet another aspect, the auxiliary floatation system of the invention is constructed so as to maintain attaching ends of the transverse drag chains (coincident with the series of junctions) at a rest elevation E above the ocean or sea bottom wherein L>E whereby a free end portion of each drag chain rests on the ocean bottom but at any conventional towing speed, such free end portion changes orientation relative to the ocean bottom and sweepline due to the resistance of the water to be angled away from the direction of net towing but wherein such free end portion still has an included segment that remains in contact with the ocean bottom. That is, when the trawl undergoes travel relative to ocean bottom, each of the transverse drag chains remains in contact with the ocean or sea bottom and creates both a physical and a visible deterrent to fish to thereby prevent their escape under the trawl net but wherein the chain links of the drag chains that attach end to-end and are formed with a number of hinges therealong, flexibly traverse and override any bottom impediments irrespective of their height or orientation.

Note that as the drag chains change orientation (due to trawl travel), there is a change is the spacing between neighboring chains located of the longitudinally extending wing or side sections of the trawl net. These sections change from a rectangular orientation relative to the ocean bottom (at rest) to a parallelogram (at conventional towing speeds).

BACKGROUND OF THE INVENTION

In bottom trawl fishing, the bottom trawl net is towed along the ocean bottom behind a towing vessel that is positioned at the surface of the ocean at a finite towing speed. Such towing speed varies, say from 1 to 7 knots per hour in operations, with about 3 knots per hour being preferred. The bottom trawl net forms an envelope with a closed back and sides and an open mouth for catching the fish. A floating system is attached to the upper leading edge of the net to keep the top of the trawl net a predetermined elevation above the ocean bottom at a specific towing speed. The lower leading edge of the net is dragged along the ocean floor via a sweepline. Due to the presence of rocks and other impediments, there is high likihood of that the trawl net will intersect and make damaging contact with the impediments during operations. However, experience has indicated there are a multiplicity of approaches to dynamically solving the damage problem to the trawl net. In some cases, the towing vessel increases speed to avoid a particularly rocky patch. Other times, the net is outfitted with conmbinations of rubber discs, washers, sleeves etc., to allow the same to operate despite the impediments. In static solving the damage problem, it is usual to repair the trawl net aboard the towing vessel before deploying the latter at sea.

In protecting the trawl net against damage, usually commercial fishing vessels are equipped with two types of sweepline gear: (i) generally, for sandy, gentle seabeds, roller gear is attached to a sweepline, such roller gear comprising a series of rollers such as described in U.S. Pat. No. 4,813,170 centrally disposed about the sweepline chain; and (ii) for more rugged, terrain, commonly a rock gear comprising rubber discs attached to the sweepline chain, the rubber discs being formed by a stamping operation in which the discs are formed from the treads of abandoned vehicle tires such as shown in U.S. Pat. No. 5,068,994. In the former, the roller gear is permitted to rotate relative to the sweepline, while in the latter, the rubber discs do not rotate but are used to absorb energy as contact with impediments occur. In addition, note in the latter situation, that a series of rubber straps can also be added in position along the U-shaped sweepline having termini in light contact with the ocean bottom since the straps are hinged and tiltable into a vertical position at a selected tow speed by the selection of a weight upstream to the straps that overcomes the drag force provided the trawl net by the tow lines. Such weight(s) are attached to a chain that extends through the centers of the straps. However, most commercial fishermen have large capital outlays in nets and sweeplines. Hence, modifications of such systems using a weighted system such as shown in U.S. Pat. No. 5,068,994 that requires re-calibrating the entire trawl and adding new sweepline elements, have been found to be costly and difficult to implement.

Other attempts to protect the trawl net against damage are shown in British Patent No. 349,8871 and Danish Patent No. 43,998 both assigned to V. D. Limited, London, England. In accordance with the patentee, weighted panels of netting are positioned to depend from the trawl net and contact the ocean bottom. However, since such panels do not include an auxiliary floatation system, such panels have been found to be difficult to implement. Moreover, since the weighted ends of the panels are adjacent to the ocean bottom, they also inflict damage on the ocean bottom and accept damage therefrom.

SUMMARY OF THE INVENTION

The present invention relates to a bottom trawl net attached to an improved sweepline system that includes a U-shaped sweepline chain composed of a series of sweepline chain segments attached together to form a reoccurring series of subunits formed along the sweepline chain. Each of the series of sweepline chain segments are linked together to form a conventional sweepline construction that is substantially parallel to the ocean bottom. The series of sweepline chain segments are buoyantly supported well above the seabed when the trawl net is at rest (i.e., the forward velocity of the trawl is zero) using an auxiliary sweepline buoyancy system. Such buoyancy system is constructed to include a series of floatation devices each attached to one of the subunits.

A series of transverse drag chains are attached relative to the sweepline chain or the like, at a series of equally spaced junctions and downwardly sweep from such junctions in a downwardly depending direction, such junctions being located below the trawl net but above the bottom of the ocean, sea or the like wherein each drag chain comprises a series of chain links of overall length L defining a series of hinges therealong at the intersection of the individual links.

In accordance with the invention, the auxiliary floatation system of the invention is constructed so as to maintain attaching ends of the transverse drag chains (coincident with the series of junctions) at a rest elevation E above the ocean or sea bottom wherein L>E whereby a free end portion of each drag chain rests on the ocean bottom but at any conventional towing speed, such free end portion changes orientation relative to the ocean bottom due to the resistance of the water to be angled away from the direction of net towing but wherein such free end portion still has an included segment that remains in contact with the ocean bottom. That is, when the trawl undergoes travel relative to ocean bottom, each of the transverse drag chains remains in contact with the ocean or sea bottom and creates both a physical and a visible deterrent to fish to thereby prevent their escape under the trawl net but wherein the chain links of the drag chains that attach end-to-end and are formed with a number of hinges therealong, flexibly traverse and override any bottom impediments irrespective of their height or orientation.

At rest, each of the drag chains is L-shaped in longitudinal cross section in the vicinity of contact with the bottom of the ocean or sea bottom wherein the free end portion thereof rests on the seabed and its attaching upper segment rises in a vertical direction from the ocean bed for attachment relative to the sweepline chain or the like.

Furthermore, note during operations, that the towing cables are attached between the towing vessel and the otterboards via a bridle which causes attachment points to the trawl net to remain at the same elevation relative to the ocean bottom whether the latter is at rest or in motion. Thus the sweepline system of the invention retains elevation integrity during operations. In that way, the drag chains create a stable visible and physical curtain between the mouth of the net and the bottom of the ocean that prevent fish from escaping under the net irrespective of what conventional forward towing speed is chosen for fishing operations. In addition, the flexible nature of the links of the drag chains permits the latter to slide over any impediments on the sea bed.

Note that the collective buoyancy system associated with the sweepline chain segments is independent of the buoyancy system associated with the leading edge of the trawl net.

In accordance with method aspects, the design of the auxiliary buoyancy system associated with the sweepline chain subunits can be achieved as follows. In this regard, it is assumed that the subunits of the invention are as previously described and the sweepline chain is positioned in the manner previously set forth. In this regard, the flotation devices are constructed wherein the mass of the water displaced by the floatation devices minus the mass of the flotation devices is essentially slightly less than the weight in water of the subunits so that as a result, when submerged and at rest, the free end portions of the drag chains of each subunit rests on the sea bed but their associated upper attached segments rise vertically upward for attachment relative to the sweepline chain.

Furthermore, the buoyancy system associated with the trawl net can be kept intact while the improved sweepline system of the present invention can be added to provide the required orientation in operations as hereinbefore described. In addition, since the sweepline chain is positioned above the ocean bottom, the sweepline rubber discs previously used in rock geared sweeplines can also be recycled for the use as proposed in the instant invention although other types of sweepline gear can be substituted, if desired.

DETAILED DESCRIPTION OF EMBODIMENTS

Figure 1:
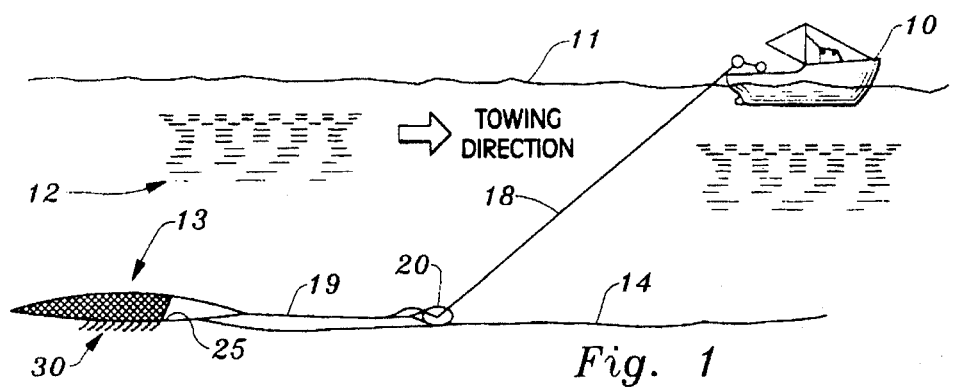
FIG. 1 is a side elevational view of a towing vessel positioned at the ocean surface towing a bottom fishing trawl net and the sweepline system of the invention in which the latter are seen to be positioned adjacent to the ocean bottom.
Figure 2:
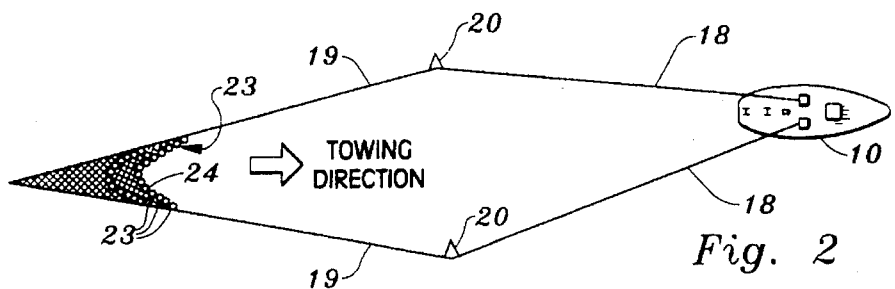
FIG. 2 is a plan view of the towing vessel, travel net and sweepline system of FIG. 1.

Referring to FIGS. 1 and 2 there is shown a towing vessel or trawler 10 at the surface 11 of the ocean 12 towing a trawl net 13 positioned adjacent to the ocean bottom 14. The trawl net 13 is connected to the towing vessel 10 through a pair of towing main lines 18 and a pair of towing ground cables 19. The towing main lines 18 and ground cables 19 connect together through a pair of laterally spaced apart otterboards 20 at the ocean bottom 14.

As shown in FIG. 2, the otterboards 20 are angled so that the seawater exerts a force perpendicular to the directional arrow 21 of travel of the vessel 10 for the purpose of spreading the trawl net 13 horizontally. Numerous flotation devices 22 of a conventional buoyancy system 23 are attached to upper leading edge 24 of the trawl net 13 for the purpose of keeping the trawl net 13 open above the ocean bottom 14. Attached to the lower edge 25 of the trawl net 13 is a sweepline system 30 of FIG. 1 connected to the ground cables 19.

Figure 3:
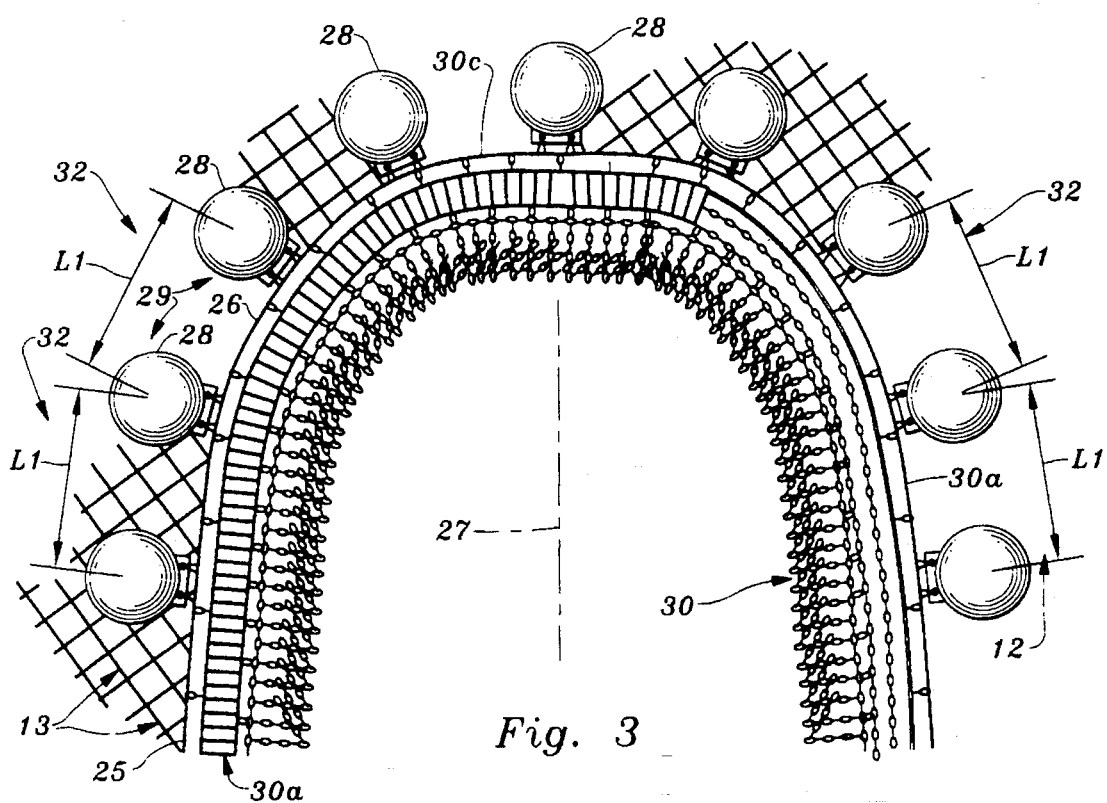
FIG. 3 is a detailed plan view of the sweepline system of FIGS. 1 and 2 at rest relative to the ocean bottom and attached to a trawl net in which the sweepline system includes a sweepline chain formed in a U-shape orientation attached to the lower edge of the net by a series of hangers, an auxiliary floatation system attached to the lower edge of the net, a series of rubber discs attached about the sweepline chain, a series of cables parallel to the sweepline chain, two of which extending through peripheral openings of the series of discs to prevent rotation, and in which a third guide cable is positioned below the circumferential edges of the discs in attachment with the second cable through a series of vertically extending anchoring chain members, and a series of drag chains depending from the third guide cable.
Figures 4, 5, 6:
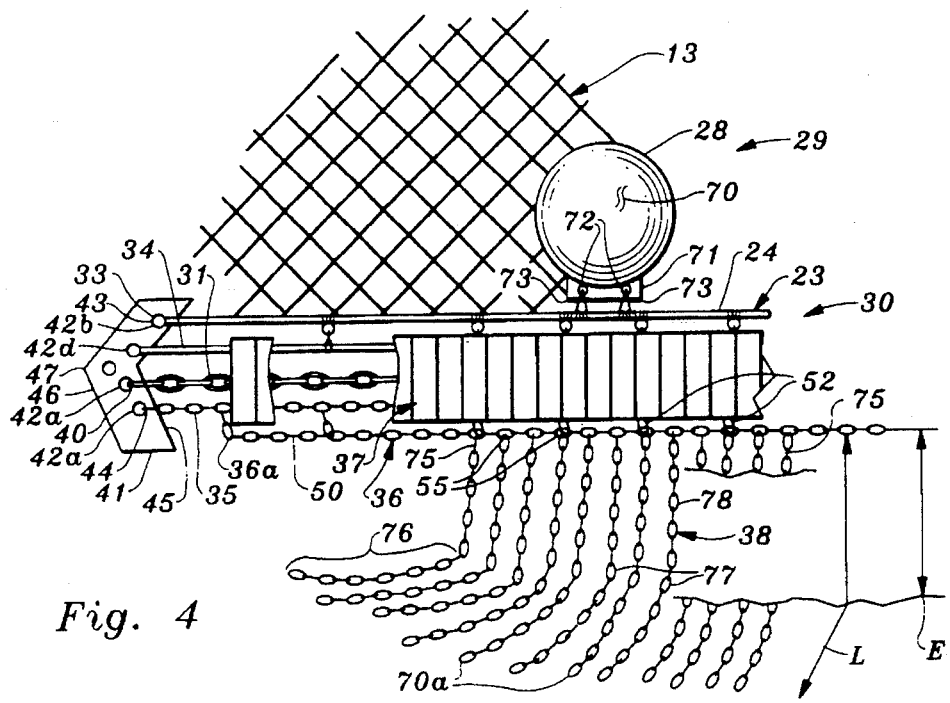
FIG. 4 is a side view detail of a portion of the sweepline system of FIG. 3 partially cut-away to illustrate the sweepline chain and the series of cables.
FIG. 5 is an enlarge detail of the discs in section to show how the cables are secured, i.e., say, relative to the lower edge of the trawl net, to the discs themselves and to each other.
FIG. 6 is a detail view of a series of modifications of the sweepline system of FIG. 4 in which the following has occurred: the system is in motion; each of the series of discs is foreshortened in section whereby the peripheral cables at the periphery of the discs of FIG. 4 are omitted, and wherein the sweepline cable is directly attached to the lower edge of the trawl net via shackled hang chains as well as supports a guide cable positioned below the foreshortened discs to which the series of drag chains extend, via shackled anchor chains and wherein an auxiliary floatation system is picture in solid line attachment with the sweepline chain and in phantom line attachment with the guide cable.

FIGS. 3, 4 and 5 show the sweepline system 30 of FIGS. 1 and 2 in more detail at the start of operations, viz., with the system 30 stationary with respect to the ocean bottom 14.

As shown in FIG. 3, the sweepline system 30 is seen to provide a U-shaped orientation relative longitudinal axis of symmetry 27 of the sweepline system 30, such sweepline system 30 being divided into longitudinal parallel legs 30a, 30b parallel to the axis of symmetry 27, and a transverse leg 30c in end contact with the parallel legs 30a, 30b normal to the axis of symmetry 27. Each of the legs 30a, 30b, 30c, in turn, is divided into a series of uniform subunits each generally indicated at 32. Each subunit 32 is of an approximate common length L1 measured along the U-shaped orientation of the sweepline system 30 and includes at least one of the floatation devices 28 comprising auxiliary buoyancy system 29 attached to terminal rope 26 defining the lower edge 25 of the trawl net 13.

Locationwise as shown in FIG. 4, the sweepline system 30 is positioned below the lower edge 25 of the trawl net 13 and includes a centralizing sweepline chain 31 co-acting with a set of cables generally indicated at 33 which penetrate through and support a series of discs 37 all of which follow the U-shaped orientation previously mentioned. The sweepline chain 31 and the set of cables 33 are positioned in varying elevations relative to the ocean bottom 14 in the manner explained below.

The set of cables 33 includes an upper wire rope 34 positioned above the sweepline chain 31 and a lower chain 35 positioned below the sweepline chain 31. The upper wire rope 34 as well as the lower chain 35 penetrate through the series of discs 37 in a like manner to the sweepline chain 31. In addition, a guide chain 36 is positioned below the sweepline chain 31 as well as below the series of discs 37 and follow the general orientation of these elements. The guide chain 36 is fixedly attached to the lower chain 35 in the manner discussed below. The purpose and function of the set of cables 33 will be described in more detail below. But suffice to say, the upper wire rope 34 and lower chain 35 are used to stabilize the series of discs 37 and prevent their rotation during operations, while the guide chain 36 is used to support the series of drag chains 38 that contact the ocean bottom 14 to form a physical curtain.

FIG. 4 shows the position of the set of cables 33 vis-a-vis the sweepline chain 31 and the guide chain 36 in more detail.

As shown, the sweepline chain 31, the wire rope 34 and lower chain 35 all extend through the series of discs 37. An end segment 40 of the sweepline chain 31 is attached to a delta plate 41 at opening 42a thereof. The wire rope 34 also has an end segment 43 attached to the delta plate 41 at opening 42b. In similar fashion, end segment 44 of the lower chain 35 is attached to the delta plate 41 at opening 42c thereof.

Note that the end segments 40, 43, 44 of the sweepline chain 31, wire rope 34 and lower chain 35, respectively, are similar in construction to similar elements that exists at their opposite ends, respectively, not shown. Positionwise, the openings 42a–42c of the delta plate 41 are aligned with inner side surface 45 of the delta plate 41. Forward side surface 46 of the delta place 41 is seen to include an apex 47. There is also an opening 42d adjacent to the apex 47 to which one of the ground cables 19 of FIGS. 1 and 2, is attached, with the other of the ground cables 19 being attached to a second delta plate similar to all respects to the delta plate 41 shown in FIG. 4.

The attachment of the guide chain 36, the drag chains 38 and the discs 37 will now be described in more detail.

Guide chain 36 is positioned below the discs 37, as well as below the sweepline chain 31, and the set of cables 33, viz., below the wire rope 34 and lower chain 35. The guide chain 36 comprises a series of links 50 of an oval cross section wherein they are interlocked end-to-end terminating in an end link 36a positioned adjacent to the delta plate 41. The guide chain 36 is attached to the lower chain 35 via a series of anchoring chain members 52, one of which attaches to the end segment 36a of the guide chain 36 as shown in FIG. 4, with the remainder being spaced along and depending from the lower chain 35.

Discs 37 are formed of a flexible material such as rubber. As shown in FIG. 5, each disc 37 has a central opening 60, first and second broad surfaces 61, 62, side wall 63 terminating in circumferential edge 64. The central opening 60 has an axis of symmetry 65. Between such axis of symmetry 65 and circumferential edge 64 are a pair of radially spaced openings 66, 67. Such openings 66, 67 each have separate axes of symmetry 68, 69 parallel to axis of symmetry 65 of the central opening 60.

Drag chains 38 comprises a series of chain links 53 of an oval cross section wherein they are interlocked end-to-end and form a series of hinges 51 at the intersection of the ends 54 of adjacent links 53, and are attached to the guide chain 36, at a series of spaced junctions 55 therealong. Such junctions 55 are formed exterior of the discs 37 but above the ocean bottom 14, see FIG. 4.

FIG. 5 shows further details of how the set of cables 33 (that includes the upper wire rope 34, lower chain 35 and guide chain 36) are mounted relative to sweepline chain 31 and discs 37.

As shown, the purpose and function of the upper wire rope 34 and lower chain 35 is to stabilize the discs 37 (provide for non-rotation), while the lower chain 35 is also used to support the guide chain 36 through anchoring chain members 52. In this regard, the upper wire rope 34 is seen to fit within an upper tier of the horizontally aligned openings 66 of the discs 37, with hanger subassemblies 85 being positioned between the wire rope 34 and the terminal rope 26 of the trawl net 13. Each hanger subassembly 85 is seen to fit within radial grooves 86 within the broad surfaces 61, 62 of adjacently positioned discs 37, and comprise a fastening link 87 attached to the wire rope 34 and thence to a tie ring 88 through a pair of connector links 89. The tie ring 88 is attached to the terminal rope 26 via a tieing string 90.

The sweepline chain 31 is positioned within horizontally aligned central openings 60. In this regard, note that the diameters of the central openings 60 are constructed so as to provide a frictional fit with links 95 that comprise the sweepline chain 31.

The lower chain 35 is seen to fit within an lower tier of the horizontally aligned openings 67 of the discs 37, with an anchoring chain member 52 downwardly depending from the lower chain 35 for attachment to the guide chain 36. The anchoring chain member 52 is seen to fit with radial grooves 91 with the broad surfaces 61, 62 of adjacent positioned discs 37, and comprise a pair of shackles 92, 93 connected to a common link 94.

The exact number of the discs 37 used in the sweepline system 30, depends upon the lengths of the U-shaped legs 30a, 30b and 30c, see FIG. 3, and the thickness of individual discs 37. Note the discs 37 are squeezed together so that neighboring broad surfaces 61, 61 of adjacent discs 37 are placed in broad contact with each other except in the regions where the anchor members 52 and hanger subassemblies 85 are positioned in vertical orientation to extend from the discs 37 in radial directions relative to longitudinal axes of symmetry 68, 69 of the openings 66, 67, respectively. In this regard, the shackles 92, 93 and common link 94 of each anchoring chain member 52 permit attachment of the guide chain 36 at positions between junctions 55 identifying attachment of the drag chains 38 to the guide chain 36.

As shown in FIG. 4, the plurality of junctions 55 identifying the attachment of the drag chains 38 to the guide chain 36, are buoyantly supported at a common elevation E above the ocean bottom 14 when the trawl net 13 is at rest (i.e., the forward velocity of the trawl net 13 is zero) using the auxiliary sweepline buoyancy system 29 attached to terminal rope 26 defining the lower edge 25 of the trawl net 13 as previously mentioned. Such buoyancy system 29 is constructed to include the flotation devices 28 previously mentioned. Such devices 28 are spherically shaped and each includes a side wall 70 and a planar plate 71 attached to a sector of the side wall 70. The planar plate 71 has a pair of openings 72 for accepting ties 73 for attaching the flotation device 28 relative to the terminal rope 26 defining the lower edge 25 of the trawl net 13.

Figure 8:
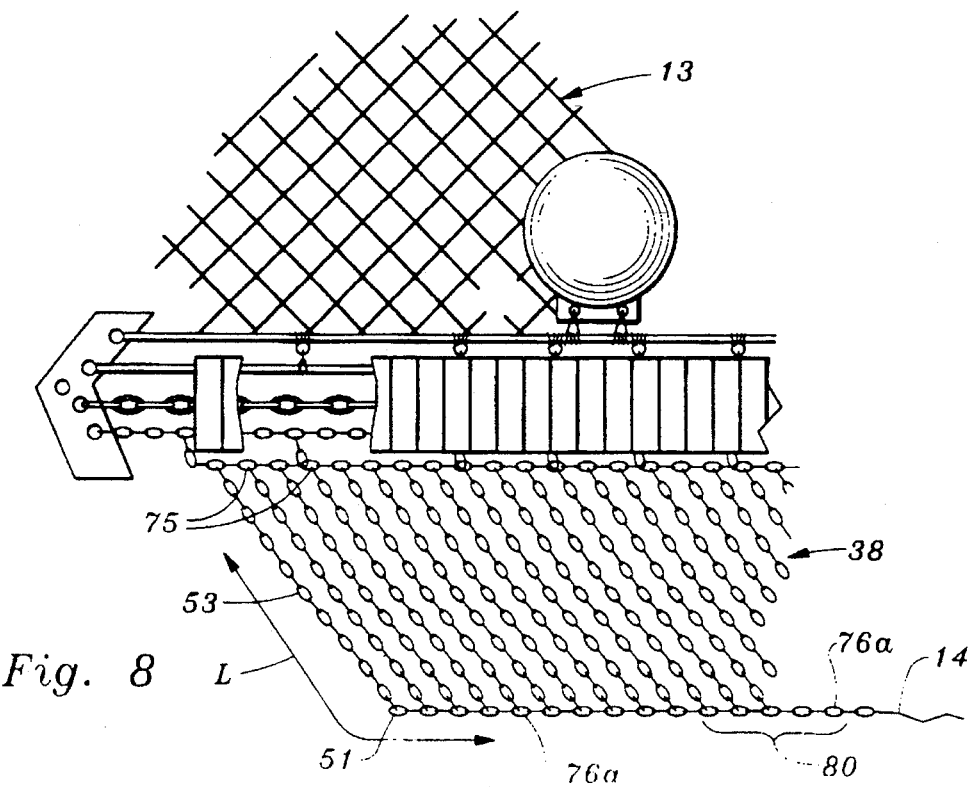
FIG. 8 is a side view detail of the portion of the sweepline system akin to that shown of FIG. 4 in which system and trawl net are moving a constant velocity relative to the ocean bottom so that the drag chains are angularly reoriented.

In operations, the purpose of each floatation device 28 is to maintain—at rest—attaching end links 75 of the transverse drag chains 38 (coincident with the series of junctions 55) at a rest elevation E above the ocean bottom 14. Each of drag chains 38 also includes a free end portion 76 that rests on the ocean bottom 14 defining a L-shape knee segment 77 that separates the free end portion 76 from the attaching portion 78. Note that each drag chain 38 defines a total length L measured from free end link 76a to attaching end link 75. At rest, the floatation devices 28 maintain the series of junctions 55 at a correct rest elevation E wherein L>E whereby the free end portions 77 of the drag chains 38 rest on the ocean bottom 14 at rest but at any conventional towing speed, such free end portions 77 change orientation relative to the ocean bottom 14 due to the resistance of the water to be angled away from the direction of towing as shown in FIG. 8. But as shown in FIG. 8, such free end portions 77 still has an included segment 80 wherein at least the free end link 76a remains in contact with the ocean bottom 14 to create a mud cloud that also deters escape of fish under the trawl net 13. That is, when the trawl net 13 undergoes travel relative to ocean bottom 14, each of the drag chains 38 remains in contact with the ocean bottom 14 and creates both a physical and a visible deterrent to fish to thereby prevent their escape under the trawl net 13 but wherein the chain links 53 that attach end-to-end and are formed with the hinges 51 as previously mentioned, aid in the drag chains 38 traverse of bottom impediments, not shown.

FIG. 6 is a detail view of a series of modifications of the sweepline system 30 of FIG. 1–5.

As shown, note in FIG. 6 that the following has occurred: the sweepline system 30' is in motion and includes a series of modified discs 37' that have been foreshortened in height whereby the previously mentioned set of peripheral cables 33 of FIG. 4 can be omitted. Also in FIG. 6, the sweepline cable 31' is directly attached to both (i) the lower edge 25 of the trawl net 13 and (ii) the guide chain 36' via a series of modified shackled subassemblies 100. The series of drag chains 38' is attached to the guide cable 36' in the manner previously described. Furthermore, a modified auxiliary floatation system 102 is picture in solid line attachment with the sweepline chain 31' and in phantom line attachment with the guide cable 26'. These elements will now be described in detail.

The series of discs 37' each includes a side wall 105 of a rubber material having end walls 104 and a central opening 107 sized to frictionally accept sweepline chain 31' and define an axis of symmetry 108. Adjacent discs 37' are in frictional contact with each other along the axis of symmetry 108 except where the sweepline chain 31' is attached to the lower edge 25 of the trawl net 13 and to the guide chain 36' via the series of shackled subassemblies 100. Each of the series of shackled subassemblies 100 is flanked by a pair of metallic washers 104 to minimize wear of the discs 37' adjacent to each of the shackled subassemblies 100.

Each of the shackled subassemblies 100 includes a central shackle 106 attached to centralized link 110 of the sweepline chain 31' from which three separate attachment chains 111, 112, 113 extend. Chain 111 extends in an upward direction for contact with ring 150 tied by tope 151 to the lower edge 25 of the trawl net 13. Chain 112 extends in a downward direction for contact with shackle 114 bolted to the guide chain 36'. Chain 113 consisting of links 113a is tied via rope 115 to the modified auxiliary floatation system 102. Such floatation system 102 consists of a series of sealed spheres 116 each having a sealed central opening 118 through which rope 114 extends.

In another embodiment shown in FIG. 6, the modified auxiliary floatation 102 is shown in phantom line in which the series of sealed spheres 116' are attached to the guide chain 36' in the same manner as described, that is, via chain 113' consisting of links 113a' tied via rope 115' to one of the sealed spheres 116' and to guide chain 36' via shackle 117.

In further regard with reference to FIG. 6, note spacing S between adjacent drag chains 38' is constructed to be less than the width of a sample fish to be caught within the trawl net 13 to physical deter escape of fish through the drag chains 38'. Also, such spacing S should not be not greater than the mesh size of the trawl net 13.

Figure 7:
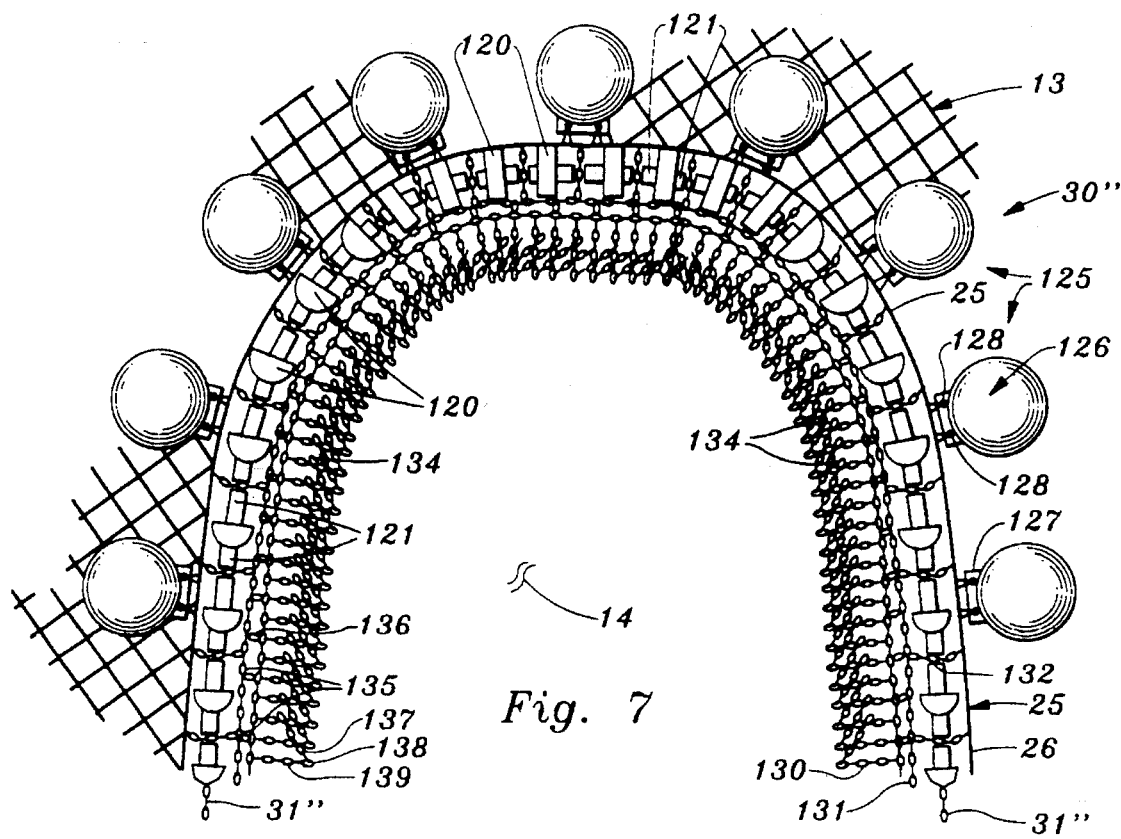
FIG. 7 is a detailed plan view of another embodiment of the sweepline system of the invention attached to a trawl net in which sweepline system is at rest relative to the ocean bottom and includes a series of rollers and spacers rotatably attached to a sweepline chain (of U-shape orientation) which is, in turn, attached to the lower edge of the net by a series of hangers, an auxiliary floatation system pictured in solid line in attachment with the lower edge of the trawl net in attachment with the sweepline chain through a series of vertically extending anchor members, and a series of drag chains depending from the guide cable.

FIG. 7 is a detailed plan view of another embodiment of the sweepline system 30" of the invention in which rollers 120 and washer spacers 121 are attached to a centralized sweepline chain 31". The purpose of the rollers 120 and washer spacers 121 is permit their rotation if they come into contact with large rocks and the like that extend above the ocean bottom 14.

As shown, such sweepline system 30" is positioned at rest relative to the ocean bottom 14 and includes a series of rollers 120 and washer spacers 121 rotatably attached to the sweepline chain 31"(formed into a U-shape orientation). Attachment of the sweepline system 30" is to the lower edge 26 of the trawl net 13 by a series of hanger chains 123 that extend upward from the sweepline chain 31". Guide chain 131 is positioned below the rollers 120 and washer spacers 121.

Also attached to the lower edge 25 of the trawl net 13 is an auxiliary floatation system 125 comprising a series of sealed spheres 126 as previously shown in FIGS. 3 and 4. They include planar plate 127 having a pair of openings 128 for accepting ties 129 for attaching the spheres 126 relative to the terminal rope 26 defining the lower edge 25 of the trawl net 13.

The series of drag chains 130 attach to the guide chain 131 in the same manner as previously described. That is, the drag chains 130 downward depend for contact with the ocean bottom 14 via a series of anchor chain members 132 attached to the sweepline chain 31" in the manner previously described.

In operations, the purpose of the auxiliary floatation system 125 is to maintain—at rest—attaching end links 135 of the drag chains 130 (coincident with a series of junctions 136 along the guide chain 131) at a rest elevation above the ocean bottom 14. Each of drag chains 130 also includes a free end portion 137 that rests on the ocean bottom 14 and defines a L-shape knee segment 138 that separates the free end portion 137 from attaching portion 139. Note that each drag chain 130 defines a total length define between free end link 134 and attaching end link 135. At rest, floatation spheres 126 maintain the series of junctions 136 at a correct rest elevation wherein the total length of the drag chains 130 is greater than the rest elevation above the ocean bottom 14 whereby the free end portions 137 of the drag chains 130 rest on the ocean bottom 14 at rest, but at any conventional towing speed, such free end portions 137 change orientation relative to the ocean bottom 14 due to the resistance of the water to be angled away from the direction of towing in the same manner as shown in FIG. 8. But as shown in FIG. 8, at least the free end links of an included segment remains in contact with the ocean bottom 14, creating both a physical and a visible deterrent to fish to thereby prevent their escape under the trawl net 13.

METHOD ASPECTS

To achieve correct positioning of the sweepline system 30, 30' and 30" relative to the ocean bottom 14, the construction of the auxiliary buoyancy systems 29, 102, 125 is such that the mass of the water displaced by such systems 29, 102, 125 minus their mass is essentially slightly less than the weight in water of the sweepline systems 30, 30' or 30" when the latter is submerged and at rest in the position depicted in FIGS. 4 and 7 wherein the drag chains 38, 38' or 130 rest on the ocean bottom 14.

In this regard, the drag chains 38, 38' and 130 each has sufficient weight in water to provide for a depending curtain to prevent fish escape from the trawl net. By constructing such drag chains 38, 38' or 130 of a corrosive resistent metal such as stainless steel, experience has shown that chains 38, 38' or 130 that have a weight in water in a range of 0.3 to 2 pounds per lineal foot are adequate in this regard. A range of 0.4 to 1 pound per lineal foot is preferred with a stainless steel chain 38, 38' or 130 with a weight of 0.5 pound per lineal foot having particular advantages.

That is, the attaching end links of the drag chains 38, 38' or 130 are located at a common elevation above the ocean bottom 14 wherein such elevation is less than the total length of each drag chain 38. 38' or 130. There is provided L-shaped positioning in cross section as previously described. But at any conventional tow velocity such as shown in FIG. 8, the drag chains 38, 38' or 130 follow an angular shape due to forward movement of the sweepline system 30, 30' or 30". Furthermore, the buoyancy system 23 associated with the trawl net 13 can be kept intact in use with the sweepline systems 30, 30' or 30".

In addition, since the sweepline system 30 of the present invention is positioned above the ocean bottom 14, the sweepline rubber discs 37 previously used in rock geared sweeplines can also be recycled for the use as proposed in the instant invention although other types of sweepline gear can be substituted, if desired as shown in FIGS. 6 and 7.

During operations of the particular sweepline system 30, the central openings 60 of the rubber discs 37 can become worn so that individual discs 37 must be replaced. In this regard, the shackle type fasteners such as shown in FIG. 6 can be used to facilitate rapid replacement.

Various modifications of the invention will become apparent to those skilled in the art from the foregoing description and accompanying drawings. Such modifications are intended to fall within the scope of the appended claims.

What is claimed is:

1. A sweepline system for connection to a series of hanging chains of a bottom trawl attached to a towing vessel at an ocean's surface through a series of towing cables wherein said bottom trawl includes a trawl net wherein said net includes a floatation system attached to a leading edge of said net to position same relative to an ocean bottom, comprising (i) a sweepline chain divided into a series of subunits of common length attached relative to a series of hanging chains of a bottom trawl net, (ii) a series of discs having central openings for attachment about said sweepline chain, (iii) a series of drag chains attached relative to said sweepline chain and extending downwardly toward an ocean bottom from a series of equally spaced junctions wherein said junctions are commonly located at a rest elevation E above an ocean bottom but below said trawl net, each drag chain having a weight in water in a range of 0.3 to 2 pounds per lineal foot and comprising a series of chain links attached end-to-end to form a number of hinges between a free end link and an attached end chain link thereby defining a total length L thereof, (iv) auxiliary floatation means attached relative to said series of junctions to maintain said series of junctions at said rest elevation E whereby a first portion of each of said series of drag chains rests on said ocean bottom but wherein at any conventional towing speed, at least said free end links of said series of drag chains remain in contact with said ocean bottom even though angularly reoriented due to water resistance so as to create both a physical and a visible deterrent to fish to thereby prevent their escape under said trawl net but wherein said hinges formed by said chain links of each of said series of drag chains, flexibly aid in overriding ocean bottom impediments.

2. The sweepline system of claim 1 in which said each drag chain is metallic and defines a weight in water in a range of 0.4 to 1 pound per lineal foot thereof.

3. The sweepline system of claim 2 in said each drag chain is constructed of stainless steel having a weight in water of about 0.5 pound per lineal foot.

4. The sweepline system of claim 1 with the addition of a guide chain positioned between said ocean bottom and said sweepline chain in positional coincidence with said series of junctions therealong whereby said series of drag chains can be attached to said guide chain to define a physical curtain to prevent escape of fish under said trawl net.

5. The sweepline system of claim 4 with the addition of first and second stabilizing cables penetrating said series of discs so as to prevent rotation thereof, said first cable being attached to said hanging chains of said trawl net, said second cable being attached to said guide chain.

6. The sweepline system of claim 4 in which said floatation means attached relative to said sweepline chain, comprises a series of flotation devices attached at spaced intervals along said guide chain.

7. The sweepline system of claim 4 in which said sweepline chain is directly attached to hanging chains at said lower edge of said trawl net, said sweepline chain also being directly attached to said guide chain.

8. The sweepline system of claim 1 in which said auxiliary floatation means attached relative to said sweepline chain, comprises a series of floatation devices attached at spaced intervals along said trawl net.

9. The sweepline system of claim 1 in which said auxiliary floatation means attached relative to said sweepline chain, comprises a series of floatation devices attached at spaced intervals along said sweepline chain.

10. The sweepline system of claim 1 in which said auxiliary floatation means is constructed to neutralize the weight in water of said sweepline chain, said series of discs, and said series of drag chains except for the weight in water of said first portions of said drag chains in contact with said ocean bottom.

11. The sweepline system of claim 1 in which said first portions of each of said series of drag chains includes an included segment defining said free end link that contacts said ocean bottom during motion of said drag chains relative to said ocean bottom to thereby create a mud cloud to visually deter escape of fish from said trawl net.

12. The sweepline system of claim 1 in which spacing between said adjacent drag chains is not greater than the mesh size of said trawl net.

13. A bottom trawl system comprising
  (i) a trawl net including a floatation system attached to a leading edge thereof to position same relative to an ocean bottom, and a series of hanging chains depending from a lower edge thereof, and
  (ii) a sweepline system attached to said series of hanging chains depending from said lower edge of said trawl net, said sweepline system including
    (a) a sweepline chain divided into a series of subunits of common length positioned substantially parallel with said lower edge of said trawl net,
    (b) a series of discs having central openings for attachment about and concentrically positioned relative to said sweepline chain,
    (c) a series of drag chains attached relative to said sweepline chain and extending downwardly toward said ocean bottom from a series of equally spaced junctions wherein said junctions are commonly located so as to define a rest elevation E above an ocean bottom but below said trawl net, each drag chain having a weight in water in a range of 0.3 to 2 pounds per lineal foot and comprising a series of cain links attached end-to-end to form a number of hinges between a free end link and an attached end chain link thereby defining a total length L for each of said series of drag chains,
    (d) auxiliary floatation means attached relative to said series of junctions so as to maintain said series of junctions at a rest elevation E relative to said ocean bottom whereby a first portion of each of said series of drag chains rests on said ocean bottom when said trawl net is at rest but wherein at any conventional towing speed, at least said free end links of said series of drag chains remain in contact with said ocean bottom even though angularly reoriented due to water resistance so as to create both a physical and a visible deterrent to fish to thereby prevent their escape under said trawl net, said hinges formed by said chain links of each of said series of drag chains, flexibly aiding in overriding ocean bottom impediments.

14. The combination of claim 13 in which said auxiliary floatation means of said sweepline stem is constructed to neutralize the weight in water of said sweepline chain, said series of discs, and said series of drag chains except for the weight in water of said first portions of said drag chains in contact with said ocean bottom.

15. The combination of claim 13 in which said each drag chain is metallic and defines a weight in water in a range of 0.4 to 1 pound per lineal foot thereof.

16. The combination of claim 13 wherein said sweepline system includes a guide chain positioned between said ocean bottom and said sweepline chain in positional coincidence with said series of junctions therealong whereby said series of drag chains can be attached to said guide chain to define a physical curtain to prevent escape of fish under said trawl net.

17. The combination of claim 16 wherein said sweepline system includes first and second stabilizing cables penetrating through said series of discs so as to prevent rotation thereof, said first cable being attached to said hanging chains of said trawl net, said second cable being attached to said guide chain.

18. The combination of claim 13 in which said auxiliary floatation means of said sweepline system, comprises a series of floatation devices attached at spaced intervals along one of said trawl net, said sweepline chain and said guide chain.

19. A method of positioning and operating a bottom trawl adjacent to a body of water's bottom to override impediments located thereon, said bottom trawl comprising a floatation system, said method comprising the steps of adding a secondary floatation system relative to a sweepline chain of a sweepline system connected to a series of hanging chains of the bottom trawl, the sweepline system including a series of discs having central openings for attachment to the sweepline chain, and a series of drag chains attached relative to the sweepline chain and extending downwardly toward a body of water's bottom when submerged in the latter from a series of equally spaced junctions, wherein the mass of the water displaced the secondary floatation system attached to the sweepline system minus its mass is essentially less than the weight in water of the sweepline system when the latter is submerged in water and is at rest wherein the junctions of the series of drag chains relative to the sweepline chain, are commonly located at a rest elevation E above the bottom of the body of water but below the trawl net, each drag chain comprising a series of chain links attached end-to-end to form a number of hinges between a free end link and an attached end chain link thereby defining a total length L thereof, submerging the bottom trawl including its floatation system and the sweepline system including its secondary floatation system and series of drag chains, wherein the series of junctions of the drag chains relative to the sweepline chain are located and maintained at the rest elevation E above the body of water's bottom whereby a first portion of each of the series of drag chains rests on the body of water's bottom wherein L>E, towing the submerged bottom trawl and sweepline system wherein at any conventional towing speed, at least the free end links of the series of drag chains remain in contact with the body of water's bottom even though angularly reorientation thereof occurs, due to water resistance so as to create both a physical and a visible deterrent to fish to thereby prevent their escape under the trawl net but wherein the hinges formed by the chain links of each of said series of drag chains, flexibly aid in overriding bottom impediments.

20. The method of claim 19 in which each drag chain has a weight in water in a range of 0.3 to 2 pounds per lineal foot.

21. The method of claim 19 in which the free end links of the series of drag chains during the towing of the submerge bottom trawl and sweepline system across the body of water, creates a mud cloud to visually deter escape of fish from the trawl net.

22. The method of claim 19 including the precursor step of determining the weight of a sweepline system when submerged in the body of water.

23. The method of claim 21 in which each drag chain is metallic and defines a weight in water in a range of 0.4 to 1 pound per lineal foot thereof.

24. The method of claim 23 in which each drag chain is constructed of stainless steel having a weight in water of about 0.5 pound per lineal foot.

* * * * *